(12) United States Patent
Silin et al.

(10) Patent No.: US 12,552,560 B2
(45) Date of Patent: Feb. 17, 2026

(54) UNMANNED AERIAL VEHICLE SUSPENDED PROPULSION SYSTEMS AND METHODS

(71) Applicant: FLIR Unmanned Aerial Systems ULC, Vancouver (CA)

(72) Inventors: Dmytro Silin, Waterloo (CA); Albert Pegg, New Dundee (CA); Martin Fleury, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 0 days.

(21) Appl. No.: 18/620,932

(22) Filed: Mar. 28, 2024

(65) Prior Publication Data

US 2024/0327044 A1 Oct. 3, 2024

Related U.S. Application Data

(60) Provisional application No. 63/493,689, filed on Mar. 31, 2023.

(51) Int. Cl.
*B64U 20/80* (2023.01)
*B64C 17/02* (2006.01)
*B64U 10/14* (2023.01)
*B64U 50/30* (2023.01)

(52) U.S. Cl.
CPC .............. *B64U 20/80* (2023.01); *B64C 17/02* (2013.01); *B64U 10/14* (2023.01); *B64U 50/30* (2023.01)

(58) Field of Classification Search
CPC ........ B64U 20/80; B64U 10/14; B64U 50/30; B64U 50/19; B64C 17/02
See application file for complete search history.

(56) References Cited

U.S. PATENT DOCUMENTS

| 2,763,189 | A | * | 9/1956 | Grill | B64D 1/04 89/1.817 |
| 5,593,113 | A | * | 1/1997 | Cox | B64D 1/22 294/82.26 |
| 5,927,649 | A | * | 7/1999 | Nykiforuk | B64D 1/22 294/82.26 |
| 6,189,834 | B1 | * | 2/2001 | Dietz | B66C 1/34 244/137.4 |
| 6,705,573 | B2 | * | 3/2004 | McDonnell | B64D 47/08 102/351 |
| 6,783,096 | B2 | * | 8/2004 | Baldwin | B64C 11/001 244/66 |

(Continued)

FOREIGN PATENT DOCUMENTS

| EP | 2741957 B1 | 10/2018 |
| RU | 191205 U1 | 7/2019 |

*Primary Examiner* — Medhat Badawi

(74) *Attorney, Agent, or Firm* — Haynes and Boone, LLP

(57) ABSTRACT

Systems and methods directed to suspended propulsion systems for an unmanned aerial vehicle (UAV) are provided. A system may include a UAV having a body and a center of gravity (CG), and a suspended propulsion system coupled to the UAV. The suspended propulsion system may include a power source for the UAV, and a harness coupled to the UAV to suspend at least a portion of the power source under the CG of the UAV. The harness may be a rigid or flexible harness configured to decouple an inertia of the suspended propulsion system from an inertia of the UAV. Additional systems and related methods are also provided.

20 Claims, 8 Drawing Sheets

(56) References Cited

U.S. PATENT DOCUMENTS

| | | | | |
|---|---|---|---|---|
| 7,610,841 B2 * | 11/2009 | Padan | B64D 37/12 | |
| | | | 89/1.8 | |
| 8,157,205 B2 | 4/2012 | McWhirk | B64B 1/06 | |
| | | | 244/30 | |
| 8,196,853 B2 | 6/2012 | Bland | B64B 1/50 | |
| | | | 244/1 R | |
| 8,370,003 B2 | 2/2013 | So | B64C 19/00 | |
| | | | 701/3 | |
| 9,027,976 B1 * | 5/2015 | Tollenaere | B66C 1/127 | |
| | | | 294/75 | |
| 9,073,647 B2 | 7/2015 | Helou, Jr. | B64G 1/40 | |
| 9,174,733 B1 * | 11/2015 | Burgess | B64D 1/12 | |
| 9,180,967 B2 * | 11/2015 | Binkholder | F41F 3/065 | |
| 9,580,173 B1 * | 2/2017 | Burgess | G05D 1/102 | |
| 9,650,136 B1 * | 5/2017 | Haskin | B64U 10/13 | |
| 9,676,481 B1 * | 6/2017 | Buchmueller | G05D 1/0094 | |
| 10,479,503 B2 * | 11/2019 | Sikora | B64D 9/00 | |
| 10,710,722 B2 | 7/2020 | Burgess | B64D 1/22 | |
| 11,505,330 B2 * | 11/2022 | Bosma | B64D 1/22 | |
| 11,591,105 B2 * | 2/2023 | Bosma | B64C 39/024 | |
| 11,591,106 B2 * | 2/2023 | Bosma | B64D 3/00 | |
| 11,618,584 B2 * | 4/2023 | Bosma | B64U 20/87 | |
| | | | 244/195 | |
| 11,623,760 B2 * | 4/2023 | Bosma | B64D 1/06 | |
| | | | 244/195 | |
| 11,634,237 B2 * | 4/2023 | Bosma | B64D 1/06 | |
| | | | 244/195 | |
| 11,639,233 B2 * | 5/2023 | Bosma | B64C 39/022 | |
| | | | 244/195 | |
| 11,667,394 B2 * | 6/2023 | Bosma | B64U 50/34 | |
| | | | 244/195 | |
| 11,673,683 B2 * | 6/2023 | Bosma | B64D 1/16 | |
| | | | 89/1.51 | |
| 11,685,545 B2 * | 6/2023 | Bosma | B64U 30/10 | |
| | | | 244/195 | |
| 11,702,220 B2 * | 7/2023 | Bosma | B67D 7/40 | |
| | | | 244/195 | |
| 11,702,221 B2 * | 7/2023 | Bosma | B64D 5/00 | |
| | | | 244/195 | |
| 11,834,174 B2 * | 12/2023 | Sikora | B64D 1/08 | |
| 11,926,415 B2 * | 3/2024 | Sikora | G06F 18/25 | |
| 11,992,444 B1 * | 5/2024 | Sikora | A61Q 3/006 | |
| 11,999,476 B1 * | 6/2024 | Dao | H01Q 1/28 | |
| 12,097,971 B2 * | 9/2024 | Bosma | B64C 39/024 | |
| 12,103,701 B2 * | 10/2024 | Bosma | B64U 30/10 | |
| 12,145,822 B2 * | 11/2024 | Sikora | A61G 1/06 | |
| 2013/0333981 A1 * | 12/2013 | Wang | F03G 7/107 | |
| | | | 74/DIG. 9 | |
| 2014/0339371 A1 * | 11/2014 | Yates | B64D 27/24 | |
| | | | 244/53 R | |
| 2019/0375615 A1 * | 12/2019 | Markwell | B66C 1/10 | |
| 2020/0346781 A1 | 11/2020 | Bosma | B67D 7/40 | |
| 2021/0053695 A1 * | 2/2021 | Bosma | B64D 1/08 | |
| 2021/0053696 A1 * | 2/2021 | Bosma | B64C 39/024 | |
| 2021/0070465 A1 * | 3/2021 | Bosma | B64C 39/024 | |
| 2021/0078721 A1 * | 3/2021 | Bosma | B67D 7/04 | |
| 2021/0107675 A1 * | 4/2021 | Bosma | B64D 1/06 | |
| 2021/0163148 A1 * | 6/2021 | Bosma | B64C 39/022 | |
| 2021/0163149 A1 * | 6/2021 | Bosma | B64U 50/34 | |
| 2021/0163150 A1 * | 6/2021 | Bosma | B64D 5/00 | |
| 2021/0163151 A1 * | 6/2021 | Bosma | B64D 5/00 | |
| 2021/0253264 A1 * | 8/2021 | Bosma | B64D 1/16 | |
| 2021/0253265 A1 * | 8/2021 | Bosma | B67D 7/40 | |
| 2022/0009647 A1 * | 1/2022 | Johannesson | B64U 20/96 | |
| 2023/0202670 A1 * | 6/2023 | Bosma | B64D 1/06 | |
| | | | 244/195 | |
| 2023/0242271 A1 * | 8/2023 | Bosma | B64C 39/024 | |
| | | | 244/195 | |
| 2023/0249820 A1 * | 8/2023 | Sikora | B64D 9/00 | |
| | | | 701/3 | |
| 2023/0391469 A1 * | 12/2023 | Bosma | B64C 39/024 | |
| 2024/0083576 A1 * | 3/2024 | Lavigne | B64U 30/20 | |
| 2024/0204493 A1 * | 6/2024 | Eide | B64U 10/60 | |
| 2024/0288481 A1 * | 8/2024 | Wu | B64U 10/13 | |
| 2024/0327044 A1 * | 10/2024 | Silin | B64U 50/19 | |
| 2024/0329263 A1 * | 10/2024 | Boelle | G01V 1/168 | |
| 2025/0002183 A1 * | 1/2025 | Sakaguchi | B64U 60/50 | |

* cited by examiner

UNMANNED AERIAL VEHICLE SUSPENDED PROPULSION SYSTEMS AND METHODS

CROSS REFERENCE TO RELATED APPLICATIONS

This application claims priority to and the benefit of U.S. Provisional Patent Application No. 63/493,689 filed Mar. 31, 2023 and entitled "UNMANNED AERIAL VEHICLE SUSPENDED PROPULSION SYSTEMS AND METHODS," which is incorporated herein by reference in its entirety.

TECHNICAL FIELD

One or more embodiments relate generally to unmanned aerial vehicles (UAVs) and more particularly, for example, to propulsion systems and methods for UAVs.

BACKGROUND

Flight endurance is an important performance metric of an unmanned aerial vehicle (UAV). An extended flight time allows a UAV to collect more information, map a larger territory, or reach remote locations, among other functions. One way to improve flight endurance is to increase the relative weight of one or more onboard energy source, e.g., batteries or fuel. At the same time, a UAV may have one or more non-flight related qualities or characteristics, such as being compact, modular, waterproof, etc. These and other features may increase the total system weight of the UAV, thus decreasing flight endurance. Existing UAVs may not have capacity to carry additional batteries or fuel onboard. The problem of low endurance may be pronounced in multi-rotor UAVs, in which the multi-rotor UAV must continuously produce lift to stay airborne. For such reasons, required power requirements for a multi-rotor UAV may be much higher compared to a fixed-wind UAV of the same weight.

SUMMARY

In one or more embodiments, a UAV is provided. The UAV includes a body having a center of gravity (CG), and a suspended propulsion system. The suspended propulsion system includes a power source for the UAV, and a harness coupled to the body to suspend at least a portion of the power source under the CG.

In one or more embodiments, a system is provided. The system includes a UAV having a body and a center of gravity (CG), and a suspended propulsion system coupled to the UAV. The suspended propulsion system includes a power source for the UAV, and a harness coupled to the UAV to suspend at least a portion of the power source under the CG of the UAV.

In one or more embodiments, a suspended propulsion system for a UAV is provided. The suspended propulsion system includes a power source for the UAV, and a harness attachable to the UAV to suspend at least a portion of the power source under a center of gravity (CG) of the UAV. The harness may be configured to decouple an inertia of the suspended propulsion system from an inertia of the UAV.

In one or more embodiments, a method is provided. The method includes coupling a suspended propulsion system to a UAV having a center of gravity (CG). The suspended propulsion system includes a power source for the UAV, and a harness coupled to the UAV to suspend at least a portion of the power source under the CG of the UAV.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
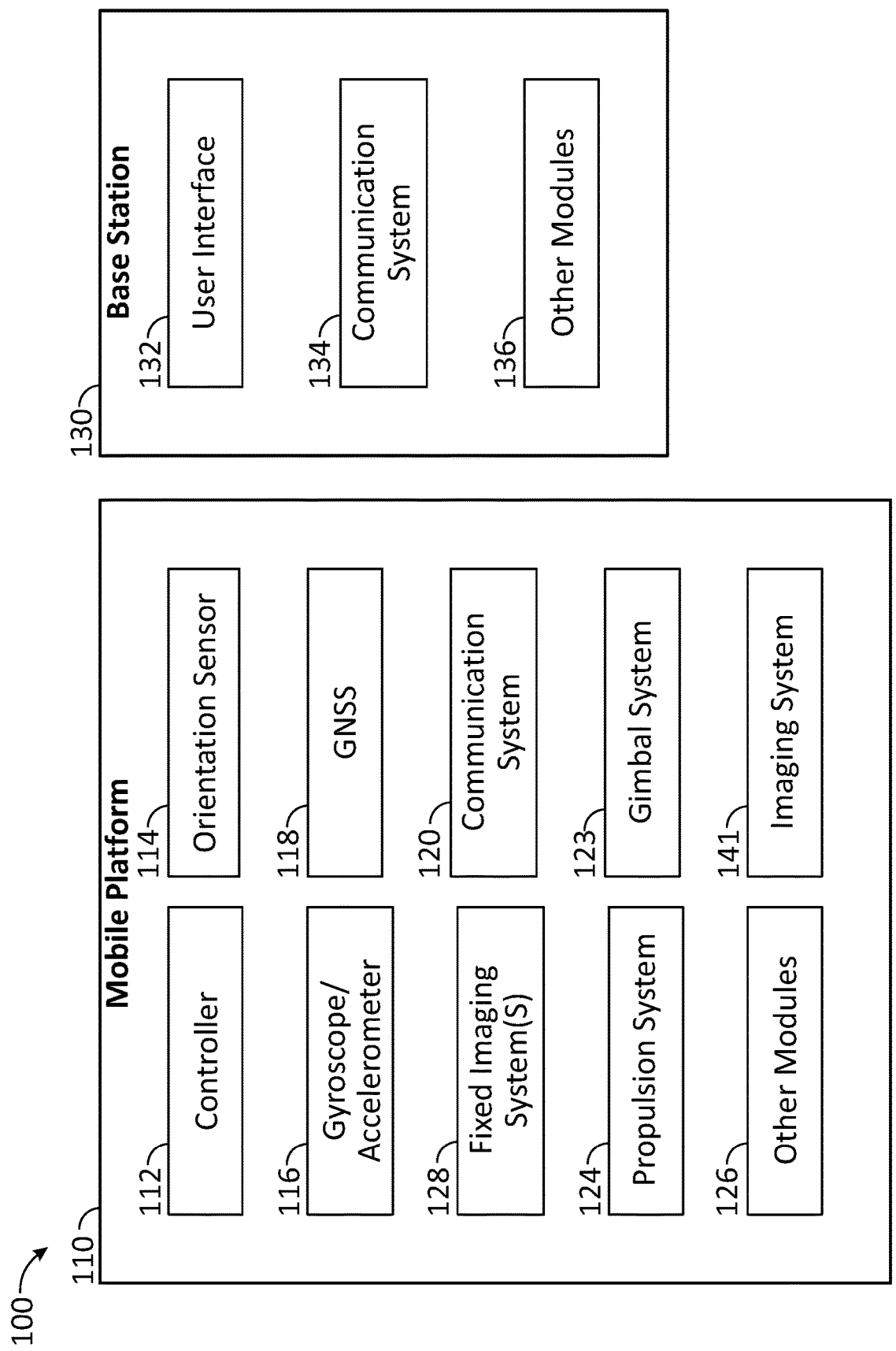
FIG. 1 illustrates a block diagram of a system, in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Systems and methods are provided for suspending certain elements of a propulsion system under a UAV. According to various embodiments of the disclosure, the propulsion system may be modular. For example, an additional battery pack, fuel cell, or solar panel, among other energy sources, can be suspended on a harness beneath the UAV, such as to increase flight endurance. In embodiments, the propulsion system components suspended under the UAV do not contribute to the total inertia of the aircraft. Thus, the suspended components may have little effect on attitude and orientation control of the UAV. In embodiments, the propulsion system components suspended under the UAV will not produce an adverse restorative moment during lateral motion of the UAV.

FIG. 1 illustrates a block diagram of a system 100, in accordance with an embodiment of the disclosure. Referring to FIG. 1, system 100 includes an unmanned aerial vehicle (UAV) 110 and a base station 130, in accordance with one or more embodiments of the disclosure. UAV 110 may be any pilotless aircraft, such as an airplane, helicopter, drone, or other machine capable of flight (e.g., a mobile platform). For example, UAV 110, which may be referred to as a drone or an unmanned aerial system (UAS), may be any pilotless aircraft for military missions, public services, agricultural application, and recreational video and photo capturing, without intent to limit. Depending on the application, UAV 110 may by piloted autonomously (e.g., via onboard computers) or via remote control. UAV 110 may include a fixed-wing, rotorcraft, or quadcopter design, although other configurations are contemplated. As a result, the term "UAV" or "drone" is characterized by function and not by shape or flight technology.

In various embodiments, UAV 110 may be configured to fly over a scene or survey area, to fly through a structure, or to approach a target and image or sense the scene, structure, or target, or portions thereof, via an imaging system 141 (e.g., using a gimbal system 123 to aim imaging system 141 at the scene, structure, or target, or portions thereof, for example). Resulting imagery and/or other sensor data may be processed (e.g., by controller 112) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of UAV 110 and/or imaging system 141, such as controlling gimbal system 123 to aim imaging system 141 towards a particular direction, or controlling propulsion system 124 to move UAV 110 to a desired position in a scene or structure or relative to a target.

UAV 110 may be implemented as a mobile platform configured to move or fly and position and/or aim imaging system 141 (e.g., relative to a selected, designated, or detected target). As shown in FIG. 1, UAV 110 may include one or more of a controller 112, an orientation sensor 114, a gyroscope/accelerometer 116, a global navigation satellite system (GNSS) 118, a communication system 120, a gimbal system 123, a propulsion system 124, and other modules 126. Operation of UAV 110 may be substantially autonomous and/or partially or completely controlled by base station 130, which may include one or more of a user interface 132, a communication system 134, and other modules 136. In other embodiments, UAV 110 may include one or more of the elements of base station 130, such as with various types of manned aircraft, terrestrial vehicles, and/or surface or subsurface watercraft. Imaging system 141 may be physically coupled to UAV 110 via gimbal system 123 and may be configured to capture sensor data (e.g., visible spectrum images, infrared images, narrow aperture radar data, and/or other sensor data) of a target position, area, and/or object(s) as selected and/or framed by operation of UAV 110 and/or base station 130.

Controller 112 may be implemented as any appropriate logic circuit and/or device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of system 100, such as gimbal system 123, imaging system 141, fixed imaging systems 128, or the propulsion system 124, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of UAV 110 such as gimbal system 123, imaging system 141, and fixed imaging system(s) 128, for example.

In some embodiments, controller 112 may be configured to substantially continuously monitor and/or store the status of and/or sensor data provided by one or more elements of UAV 110, gimbal system 123, imaging system 141, fixed imaging system(s) 128, and/or base station 130, such as the position and/or orientation of UAV 110, gimbal system 123, imaging system 141, and/or base station 130, for example.

Orientation sensor 114 may be implemented as one or more of a compass, float, accelerometer, and/or other device capable of measuring an orientation of UAV 110 (e.g., magnitude and direction of roll, pitch, and/or yaw, relative to one or more reference orientations such as gravity and/or Magnetic North), gimbal system 123, fixed imaging system(s) 128, and/or other elements of system 100, and providing such measurements as sensor signals and/or data that may be communicated to various devices of system 100.

Gyroscope/accelerometer 116 may be implemented as one or more inertial measurement units (IMUs), electronic sextants, semiconductor devices, integrated chips, accelerometer sensors, accelerometer sensor systems, or other devices capable of measuring angular velocities/accelerations and/or linear accelerations (e.g., direction and magnitude) of UAV 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of UAV 110 (e.g., or an element of UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100 and other nodes participating in a mesh network. In some embodiments, GNSS 118 may include an altimeter, for example, or may be used to provide an absolute altitude.

Communication system 120 may be implemented as any wired and/or wireless communication system configured to transmit and receive analog and/or digital signals between elements of system 100 and other nodes participating in a mesh network. For example, communication system 120 may be configured to receive flight control signals and/or data from base station 130 and provide them to controller 112 and/or propulsion system 124. In other embodiments, communication system 120 may be configured to receive images and/or other sensor information (e.g., visible spectrum and/or infrared still images or video images) from fixed imaging system(s) 128 and/or imaging system 141 and relay the sensor data to controller 112 and/or base station 130. In some embodiments, communication system 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between elements of system 100 substantially continuously throughout operation of system 100, where such data includes various types of sensor data, control parameters, and/or other data, as described herein.

Gimbal system 123 may be implemented as an actuated gimbal mount, for example, that may be controlled by controller 112 to stabilize and direct imaging system 141 relative to a target or to aim imaging system 141 according to a desired direction and/or relative orientation or position. For example, controller 112 may receive a control signal from one or more components of system 100 to cause gimbal system 123 to adjust a position of imaging system 141 as described in the disclosure. As such, gimbal system 123 may be configured to provide a relative orientation of imaging system 141 (e.g., relative to an orientation of UAV 110) to controller 112 and/or communication system 120 (e.g., gimbal system 123 may include its own orientation sensor 114). In other embodiments, gimbal system 123 may be implemented as a gravity driven mount (e.g., non-actuated). In various embodiments, gimbal system 123 may be configured to provide power, support wired communications, and/or otherwise facilitate operation of articulated sensor/imaging system 141. In further embodiments, gimbal system 123 may be configured to couple to a laser pointer, range finder, and/or other device, for example, to support, stabilize, power, and/or aim multiple devices (e.g., imaging system 141 and one or more other devices) substantially simultaneously.

In some embodiments, gimbal system 123 may be adapted to rotate imaging system 141 +−90 degrees, or up to 360 degrees, in a vertical plane relative to an orientation and/or position of UAV 110. In further embodiments, gimbal system 123 may rotate imaging system 141 to be parallel to a longitudinal axis or a lateral axis of UAV 110 as UAV 110 yaws, which may provide 360 degree ranging and/or imaging in a horizontal plane relative to UAV 110. In various embodiments, controller 112 may be configured to monitor an orientation of gimbal system 123 and/or imaging system 141 relative to UAV 110, for example, or an absolute or relative orientation of an element of imaging system 141 (e.g., a sensor of imaging system 141). Such orientation data may be transmitted to other elements of system 100 for monitoring, storage, or further processing, as described herein.

Propulsion system 124 may be implemented as one or more propellers, turbines, or other thrust-based propulsion systems, and/or other types of propulsion systems that can be used to provide motive force and/or lift to UAV 110 and/or to steer UAV 110. In some embodiments, propulsion system 124 may include multiple propellers (e.g., a tri, quad, hex, oct, or other type "copter") that can be controlled (e.g., by controller 112) to provide lift and motion for UAV 110 and to provide an orientation for UAV 110. In other embodiments, propulsion system 124 may be configured primarily to provide thrust while other structures of UAV 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Fixed imaging system(s) 128 may be implemented as an imaging device fixed to the body of UAV 110 such that a position and orientation is fixed relative to the body of the mobile platform, according in various embodiments. Fixed imaging system(s) 128 may include one or more imaging modules, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, an imaging module of a fixed imaging system 128 may include one or more logic devices that can be configured to process imagery captured by detector elements of the imaging module before providing the imagery to controller 112. Fixed imaging system(s) 128 may be arranged on the UAV 110 and configured to perform any of the operations or methods described herein, at least in part, or in combination with controller 112 and/or user interface 132. An example fixed imaging system(s) 128 configuration includes using 6 fixed imaging systems, each covering a 90-degree sector to give complete 360-degree coverage. Using on-chip down-sampling of the images provided by fixed imaging system(s) 128 to approximately the order of 128×128 pixels and recording at 1200 Hz, the fixed imaging system(s) 128 can track rotations of 1000-1500 degrees per second with an optical flow of less than one pixel per frame. The same one-pixel optical flow per frame criteria would be fulfilled when flying UAV 110 at speeds in excess of 10 m/s at 1 m distance from the surface (e.g., wall, ground, roof, etc.). When not sampling at high rates, these low-resolution fixed imaging system(s) 128 may consume little power and thus minimally impact an average power consumption for UAV 110. Thus, a motion-dependent frame rate adjustment may be used to operate efficiently where the frame rate can be kept high enough to maintain the one pixel optical-flow per the frame tracking criteria.

Other modules 126 may include other and/or additional sensors, actuators, communications modules/nodes, and/or user interface devices, for example, and may be used to provide additional environmental information related to operation of UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of UAV 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to UAV 110, where each actuated device includes one or more actuators adapted to adjust an orientation of the device, relative to UAV 110, in response to one or more control signals (e.g., provided by controller 112). Other modules 126 may include a stereo vision system configured to provide image data that may be used to calculate or estimate a position of UAV 110, for example, or to calculate or estimate a relative position of a navigational hazard in proximity to UAV 110. In various embodiments, controller 112 may be configured to use such proximity and/or position information to help safely pilot UAV 110 and/or monitor communication link quality with the base station 130.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication system 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In some embodiments, user interface 132 may be adapted to accept user input including a user-defined target heading, waypoint, route, and/or orientation for an element of system 100, for example, and to generate control signals to cause UAV 110 to move according to the target heading, route, and/or orientation, or to aim imaging system 141. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., imaging system 141) associated with UAV 110, for example, and to generate control signals for adjusting an orientation and/or position of the actuated device according to the target altitude, orientation, and/or position. Such control signals may be transmitted to controller 112 (e.g., using communication system 134 and 120), which may then control UAV 110 accordingly.

Communication system 134 may be implemented as any wired and/or wireless communication system configured to transmit and receive analog and/or digital signals between elements of system 100 and/or nodes participating in a mesh network. For example, communication system 134 may be configured to transmit flight control signals or commands from user interface 132 to communication systems 120 or 144. In other embodiments, communication system 134 may be configured to receive sensor data (e.g., visible spectrum and/or infrared still images or video images, or other sensor data) from UAV 110. In some embodiments, communication system 134 may be configured to support spread spectrum transmissions, for example, and/or multiple simultaneous communications channels between elements of system 100. In various embodiments, communication system 134 may be configured to monitor the status of a communication link established between base station 130, UAV 110, and/or the nodes participating in the mesh network (e.g., including packet loss of transmitted and received data between elements of system 100 or the nodes of the mesh network, such as with digital communication links). Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of UAV 110 and/or system 100 or to process sensor data to compensate for environmental conditions, such as an water content in the atmosphere approximately at the same altitude and/or within the same area as UAV 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for UAV 110, using one or more power leads. Such power leads may also be used to support one or more communication techniques between elements of system 100.

Figure 2A:
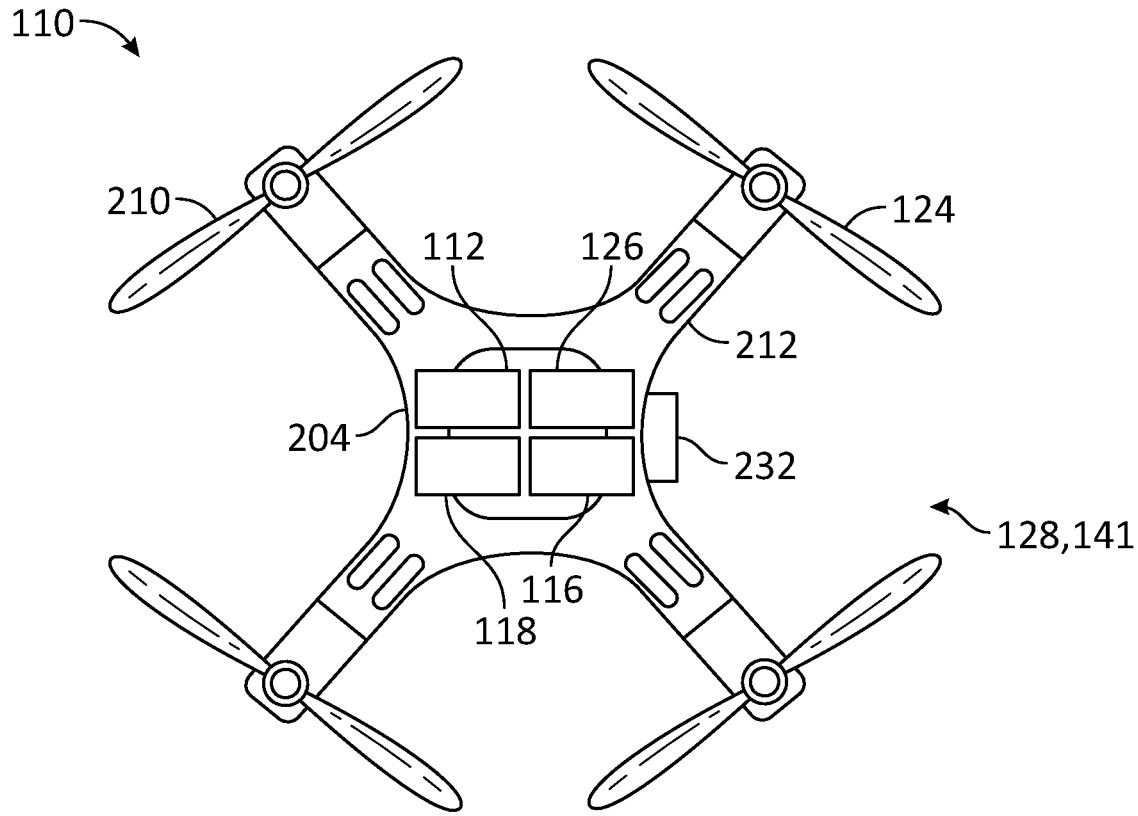
FIG. 2A illustrates a diagram of a UAV, in accordance with an embodiment of the disclosure.

FIG. 2A illustrates a diagram of UAV 110. Referring to FIG. 2A, UAV 110 may include a body 204 and propulsion system 124. Propulsion system 124 may be configured to propel UAV 110 for flight. For example, propulsion system 124 may include one or more propellers 210 connected to body 204, such as via respective arms or wings 212 extending from body 204. Depending on the application, propellers 210 may have a fixed orientation, or propellers 210 may move, to provide a desired flight characteristic. Operation of propulsion system 124 may be substantially autonomous and/or partially or completely controlled by a remote system (e.g., a remote control, a tablet, a smartphone, base station 130, etc.).

Body 204 may be equipped with controller 112 that may include one or more logic devices. Each logic device, which may be referred to as an on-board computer or processor, may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of a system, for example. Such software instructions may implement methods for processing images and/or other sensor signals, determining sensor information, providing user feedback, querying devices for operational parameters, selecting operational parameters for devices, or performing any of the various operations described herein (e.g., operations performed by one or more devices of UAV 110).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of UAV 110. For example, controller 112 may be adapted to store sensor signals, sensor information, and/or operational parameters, over time, for example, and provide such stored data to a user. In some embodiments, controller 112 may be integrated with one or more other elements of UAV 110, for example, or distributed as multiple logic devices within UAV 110.

Controller 112 may be configured to perform a set of operations. For example, controller 112 may be configured for flight control and position estimation, among other operations. For position estimation, UAV 110 may be equipped with GNSS 118 and/or gyroscope/accelerometer 116 to provide position measurements. For example, GNSS 118 and/or gyroscope/accelerometer 116 may provide frequent measurements to controller 112 for position estimation. In embodiments, controller 112 may be configured for video/image processing and communication. Specifically, controller 112 may process one or more images captured by one or more cameras of UAV 110, as described below. Although specific flight module and imagery module capabilities are described with reference to controller 112, respectively, the flight module and imagery module may be embodied as separate modules of a single logic device or performed collectively on multiple logic devices.

In embodiments, UAV 110 may include other modules, such as other and/or additional sensors, actuators, communications modules/nodes, and/or user interface devices used to provide additional operational and/or environmental information, for example. In some embodiments, other modules may include navigational or environmental sensors providing measurements and/or other sensor signals that can be displayed to a user and/or used to provide operational control of UAV 110, as described herein. In various embodiments, other modules may include a power supply implemented as any power storage device configured to provide enough power to each element of UAV 110 to keep all such elements active and operable.

Figure 2B:
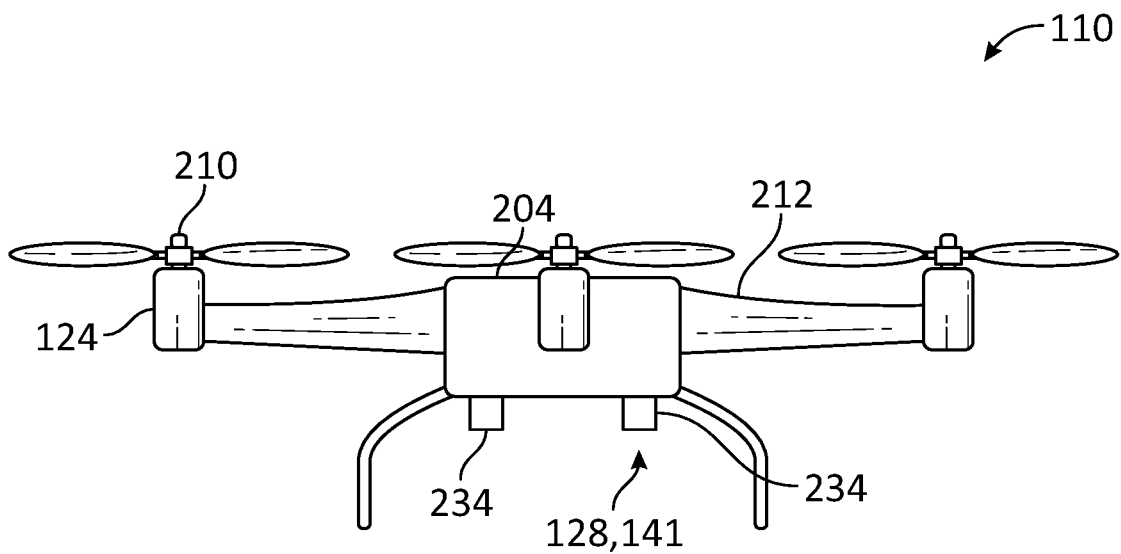
FIG. 2B illustrates another diagram of the UAV, in accordance with an embodiment of the disclosure.

FIG. 2B illustrates a diagram of a side view of UAV 110, in accordance with an embodiment of the disclosure. Referring to FIGS. 2A-2B, UAV 110 may include one or more cameras, such as several cameras (e.g., pointing in same or different directions). For example, fixed imaging system(s) 128 and/or imaging system 141 may include a front camera 232 pointing in the direction of travel. In embodiments, front camera 232 may be fixed or connected to gimbal system 123 to aim front camera 232 as desired. Referring to FIG. 2B, fixed imaging system(s) 128 and/or imaging system 141 may include one or more navigation cameras 234 pointing down and to the sides of body 204. Navigation cameras 234 may be fixed or connected to gimbal system 123 to aim navigation cameras 234 as desired. Navigation cameras 234 may support position estimation of UAV 110, such as when GPS data is inaccurate, GNSS 118 is inoperable or not functioning properly, etc. For example, images from navigation cameras 234 (and/or front camera 232) may be provided to controller 112 for analysis (e.g., position estimation).

Front camera 232 and/or navigation cameras 234 may be configured to capture one or more images (e.g., visible and/or non-visible images), such as a stream of images. For example, front camera 232 and/or navigation cameras 234 may be configured to capture visible, infrared, and/or thermal infrared images, among others. Each camera may include an array of sensors (e.g., a multi-sensor suite) for capturing thermal images (e.g., thermal image frames) in response to infrared radiation. In embodiments, front camera 232 and/or navigation cameras 234 may capture short-wave infrared (SWIR) light (e.g., 1-2 µm wavelengths), mid-wave infrared (MWIR) light (e.g., 3-5 µm wavelengths), and/or long-wave infrared (LWIR) light (e.g., 8-15 µm wavelengths). In embodiments, front camera 232 and/or navigation cameras 234 may capture visible and infrared fused images. For instance, both a visible and a thermal representation of a scene (e.g., a search area) may be captured and/or presented to the pilot or another user of the system.

Figure 3:
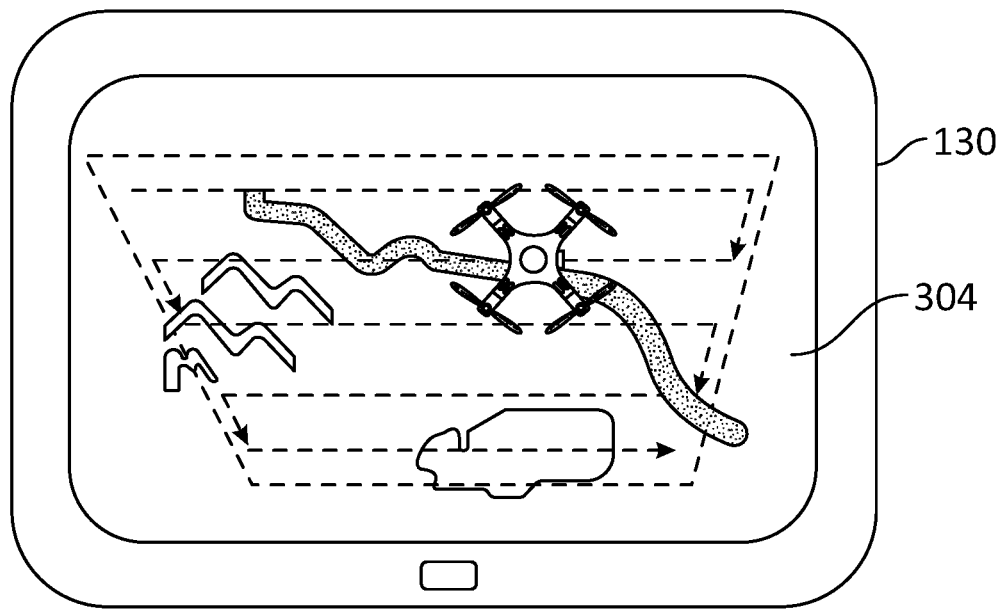
FIG. 3 illustrates a diagram of a base station or controller, in accordance with an embodiment of the disclosure.

FIG. 3 illustrates a diagram of base station 130, in accordance with an embodiment of the disclosure. Base station 130 may be implemented as one or more of a tablet, a display, a touch screen, a keyboard, a mouse, a joystick, a knob, a steering wheel, and/or any other device capable of accepting user input and/or providing feedback to a user. In various embodiments, base station 130 may provide a user interface 304 (e.g., a graphical user interface) adapted to receive user input. Base station 130 may be implemented with one or more logic devices that may be adapted to store and/or execute instructions, such as software instructions, implementing any of the various processes and/or methods described herein. For example, base station 130 may be adapted to form communication links, transmit and/or receive communications (e.g., sensor signals, control signals, sensor information, user input, and/or other information), for example, or to perform various other processes and/or methods described herein The pilot may have control of UAV 110 and access to UAV data using base station 130. For example, base station 130 may be connected to UAV 110 using a wireless link, such as a wireless link having enough bandwidth for video and data transmission. Base station 130 may include an image panel and an input panel. In embodiments, user interface 304 may function as both the image panel and the input panel. The image panel may be used to view image/video feeds from one or more cameras on-board UAV 110, such as front camera 232 and/or navigation cameras 234. The input panel may be configured to receive user input, such as via the user's finger, a stylus, etc. For example, input panel may allow the pilot to configure different UAV and/or search settings. In embodiments, base station 130 may provide a map for the pilot to locate UAV 110 during flight. In some embodiments, one or more accessories may be connected to the base station 130, such as a joystick for better flight control of UAV 110. As shown, the base station 130 may be a tablet, although other configurations are contemplated.

Figure 4:
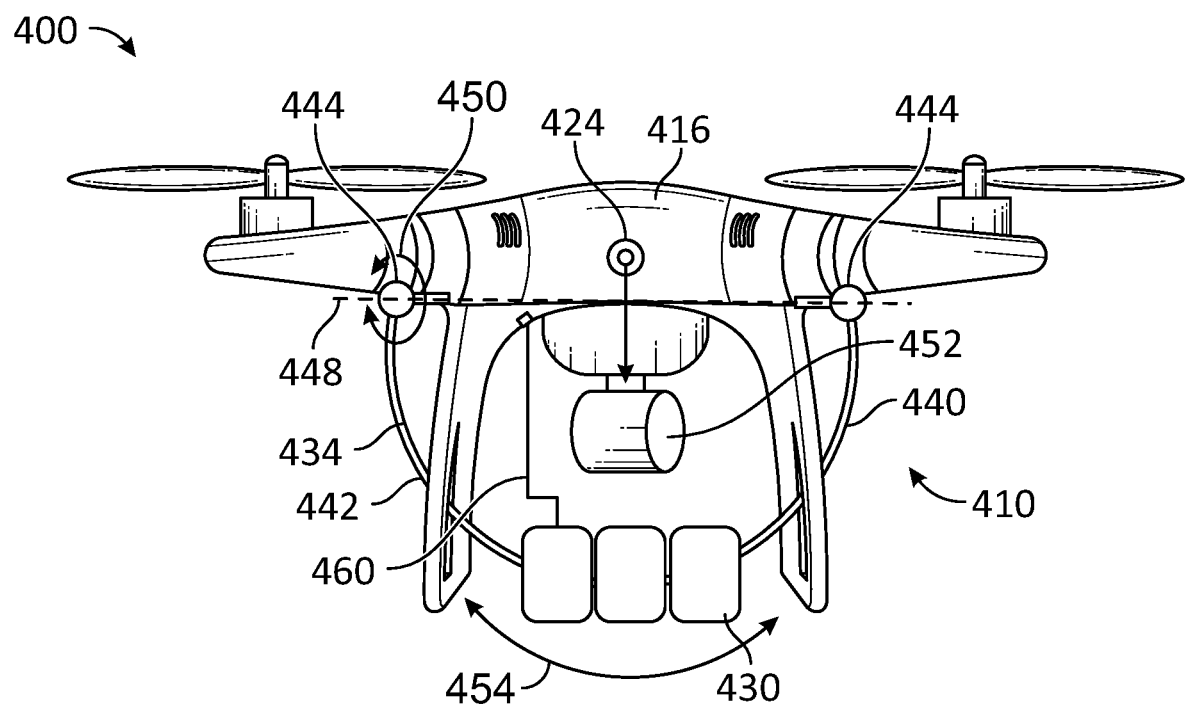
FIG. 4 illustrates a diagram of a UAV including a suspended propulsion system, in accordance with an embodiment of the disclosure.

FIG. 4 illustrates a diagram of a UAV 400 including a suspended propulsion system (SPS) 410, in accordance with an embodiment of the disclosure. Except as otherwise noted below, UAV 400 may be similar to UAV 110, described above. For example, UAV 400 may include a body 416 having one or more components (e.g., propellers) configured to propel UAV 400 for flight. As shown, UAV 400 may be a multi-rotor aircraft, such as a quadcopter, although other configurations are contemplated, including fixed-wing, rotorcraft, and other "copter" designs. In each implementation, body 416 and/or UAV 400 may have a center of gravity (CG) 424.

SPS 410 is configured to suspend one or more propulsion components under UAV 400. For example, SPS 410 may include various harnesses, attachments, joints, and/or other components, as described below, to suspend a power source 430 for UAV 400 under CG 424. In embodiments, SPS 410 may provide at least one (e.g., two or three) rotational degrees of freedom between power source 430 and body 416/UAV 400, such as to allow power source 430 to move relative to body 416/UAV 400 during flight. In this manner, the degrees of freedom provided by SPS 410 may decouple the inertia of the SPS 410 from the inertia of body 416/UAV 400. This decoupling of inertia may allow a reduced power requirement to control attitude of the entire system. In embodiments, power source 430 may include one or more energy sources for UAV 400, such as at least one of a battery, a fuel cell, or a solar panel, among other energy sources.

In embodiments, SPS 410 includes a harness 434 attached to body 416 to suspend at least a portion of power source 430 under CG 424. Referring to FIG. 4, harness 434 may include a rigid harness 440. For example, rigid harness 440 may include an arc-shaped hoop 442 attached to body 416 at a pair of joints 444, although other rigid configurations are contemplated. In embodiments, rigid harness 440 may be attached to one or more service ports of body 416 and/or integrated to a main payload interface of UAV 400, among other attachment points. As shown, hoop 442 is installed under UAV 400 to position power source 430 under CG 424. In embodiments, joints 444 may define a horizontal axis 448 about which hoop 442 can pivot or swing. In this manner, joints 444 may define a first rotational degree of freedom 450 between power source 430 and body 416/UAV 400, such as to allow hoop 442 to swing (e.g., freely) relative to body 416/UAV 400 about horizontal axis 448. In embodiments, hoop 442 may be shaped to accommodate a payload 452 of UAV 400. Depending on the application, payload 452 may include imaging system 128 and/or imaging system 141 (e.g., with gimbal system 123) or any other payload attached to UAV 400.

With continued reference to FIG. 4, power source 430 may be coupled to hoop 442, such as to slide along hoop 442 between the pair of joints 444. For example, power source 430 may be slidably installed on hoop 442 (e.g., with roller bearings). This slidable engagement of power source 430 on hoop 442 may define a second rotational degree of freedom 454 between power source 430 and body 416/UAV 400, such that power source 430 can slide or swing laterally on hoop 442 (e.g., sideways between joints 444). In this manner, rigid harness 440 may provide at least two rotational degrees of freedom between body 416/UAV 400 and power source 430. As shown, power source 430 may be a set of extra batteries assembled into an array with one common electric cable 460, although other configurations are contemplated. In such embodiments, the cable 460 between power source 430 and UAV 400 may have enough slack to provide connection in any possible combination of angles between UAV 400, harness 434, and power source 430.

In embodiments, rigid harness 440 may complement and/or otherwise account for gimbal system 123. For example, rigid harness 440 may provide angular ranges of movement that exceed those provided by gimbal system 123. In one example, pitch and roll of UAV 400 may be limited by payload gimbals to +/−23 degrees. In such embodiments, rigid harness 440 may exceed the payload gimbal angular ranges, such as providing +/−28 degrees in roll and +/−30 degrees in one example. Such embodiments may reduce image distortion, dynamic influences, and/or other detrimental effects caused by impact of rigid harness 440 and/or power source 430 reaching extreme positions during high pitch and roll maneuvers of UAV 400.

Suspending batteries or other types of energy sources under the aircraft may serve two purposes. First, the combination of the roller bearings and joints 444 may allow the suspended elements to act as a pendulum bob, with the suspended elements staying under CG 424. This may reduce the power required to trim UAV 400 during maneuvers. Second, the combination of the roller bearings and joints 444 may decouple aircraft inertia from the inertia of the suspended system. This may reduce the power required to maintain attitude of UAV 400 in pitch and roll.

Figure 5:
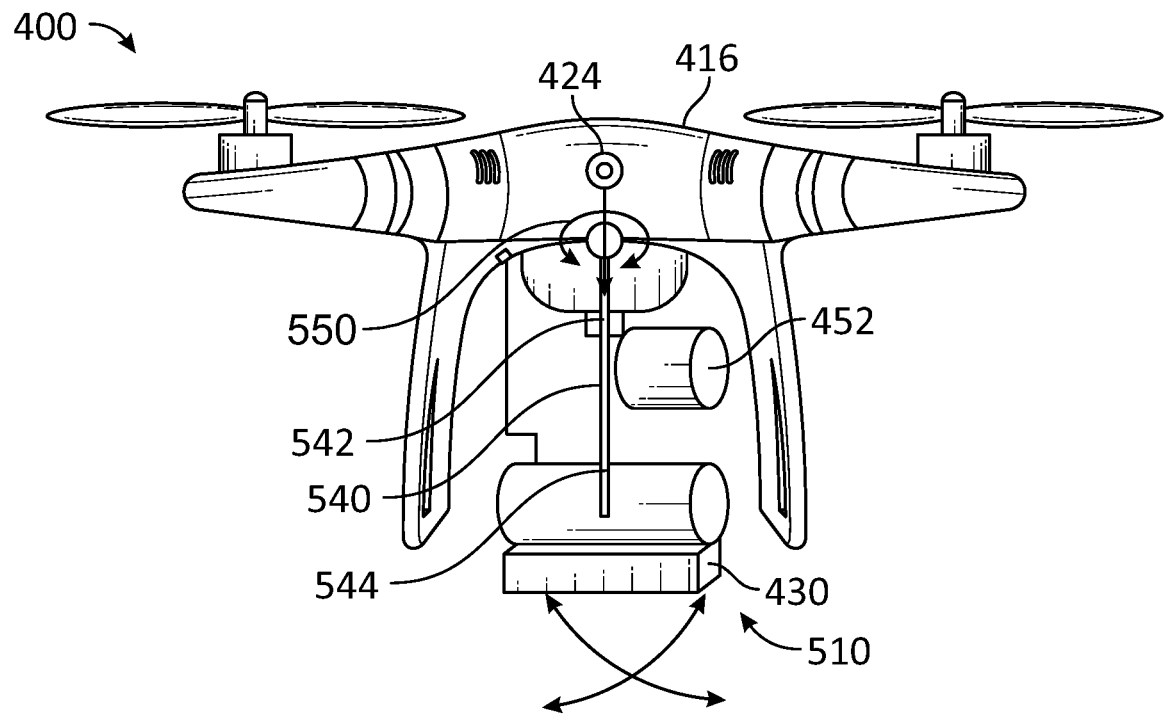
FIG. 5 illustrates a diagram of a UAV including another suspended propulsion system, in accordance with an embodiment of the disclosure.

FIG. 5 illustrates a diagram of UAV 400 including another SPS 510, in accordance with an embodiment of the disclosure. Except as otherwise noted below, SPS 510 may be similar to SPS 410, described above. For example, SPS 510 may suspend at least a portion of power source 430 under the CG 424 of the aircraft. Referring to FIG. 5, harness 434 may include a flexible harness 540 attached to body 416 under CG 424. As shown, flexible harness 540 includes an upper end 542 attached to body 416, and a lower end 544 carrying suspended elements of propulsion system (e.g., a suspended fuel cell system, a combination of power sources, an array of batteries, etc.).

Compared to rigid harness 440, flexible harness 540 may have two main differences. First, flexible harness 540 may be attached to body 416 directly under CG 424. In such embodiments, the bottom-mounted payload 452 may be attached to a different location. Second, flexible harness 540 may provide an additional rotational degree of freedom (e.g., a third rotational degree of freedom 550) between body 416/UAV 400 and power source 430. In such embodiments, the inertia of SPS 510 may be decoupled from the aircraft inertia in pitch, roll, and yaw. This may result in an additional reduction of power required to maintain aircraft attitude. In embodiments, the twist in flexible harness 540 due to aircraft rotation around a vertical axis may not be a concern during free flight of UAV 400. Should a continuous rotation of UAV 400 in yaw be required, a power transmitting swivel can be added to flexible harness 540 to avoid excessive twisting.

Figure 6:
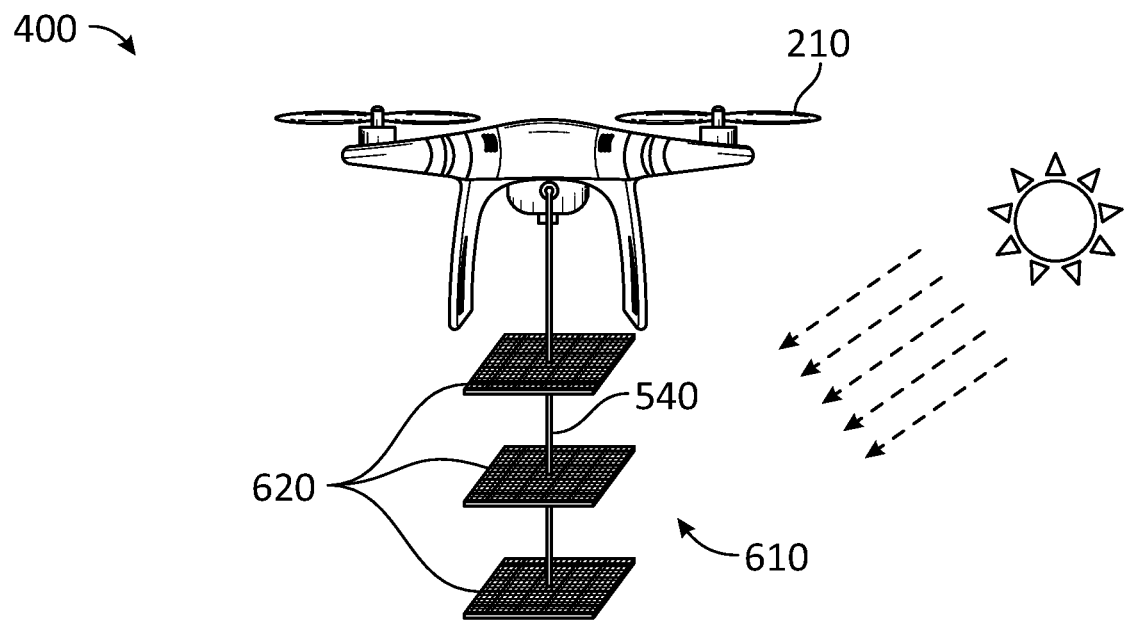
FIG. 6 illustrates a diagram of a UAV including another suspended propulsion system, in accordance with an embodiment of the disclosure.

FIG. 6 illustrates a diagram of UAV 400 including another SPS 610, in accordance with an embodiment of the disclosure. Except as otherwise noted below, SPS 610 may be similar to SPS 410 and/or SPS 510, described above. Referring to FIG. 6, power source 430 may include a plurality of elements suspended along flexible harness 540, such as in a garland arrangement, for instance. For example, power source 430 may include an array of solar panels 620 suspended along flexible harness 540. In such embodiments, flexible harness 540 may be long enough to minimize interference between propellers 210 and solar panels 620 (e.g., improved aerodynamics) and between the solar panels 620 themselves (e.g., reduced shading on the solar panels 620). Such embodiments are illustrative only, and one or all solar panels 620 may be replaced with other energy sources (e.g., a fuel cell, batteries, etc.).

In embodiments, one or more elements suspended on flexible harness 540 may be dropped, such as one by one. For example, at least a lowermost element may be configured to be decoupled from flexible harness 540 during flight of UAV 400. If solar panels 620 are replaced with fuel tanks or batteries, then depleted elements can be dropped one by one starting from the lowermost element. In this manner, unnecessary weight can be removed to extend flight endurance. Additionally, or alternatively, elements can be selectively removed (e.g., during flight) based on changing flight conditions and/or maneuverability requirements.

Figure 7:
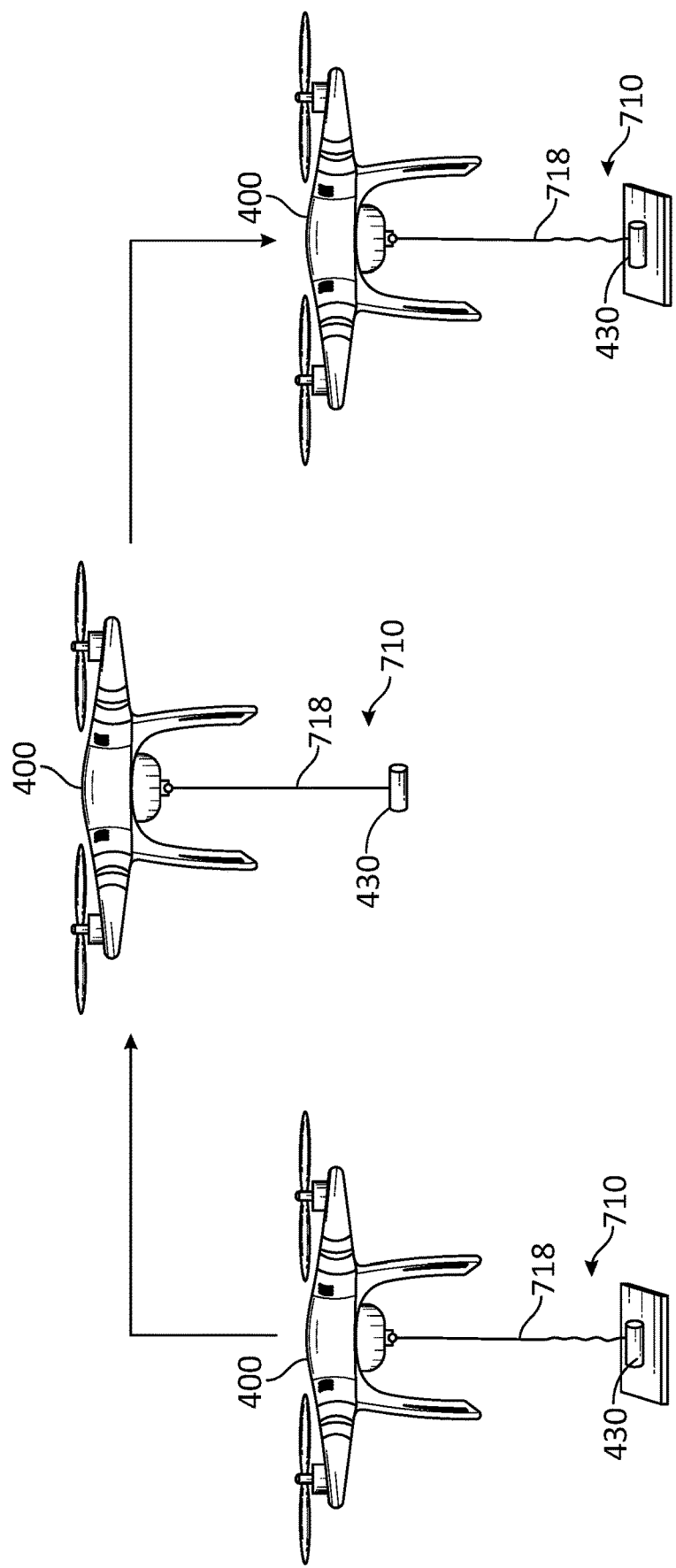
FIG. 7 illustrates a diagram of UAV operations utilizing at least a portion of a suspended propulsion system resting on the ground, in accordance with an embodiment of the disclosure.

FIG. 7 illustrates a diagram of UAV 400 operations utilizing at least a portion of an SPS 710 resting on the ground, in accordance with an embodiment of the disclosure. Except as otherwise noted below, SPS 710 may be similar to SPS 410, SPS 510, and/or SPS 610, described above. Referring to FIG. 7, SPS 710 may include a long cable 718 and power source 430 resting on the ground. For example, UAV 400 may hover above a fuel tank and/or one or more extra batteries resting on the ground. Such embodiments may provide increased hover time for systems hovering around the same location.

During normal operation, UAV 400 may hover in place with a portion of SPS 710 (e.g., power source 430) remaining on the ground. In embodiments, UAV 400 may hover at an altitude introducing slack in cable 718 as power source 430 rests on the ground. Such embodiments may provide a reduced power requirement since only UAV 400 and cable 718 must be supported, thereby increasing hover time of UAV 400. In embodiments, UAV 400 may have enough thrust to perform one or more short hops (e.g., a short distance relocation) with the fully loaded/full weight of the suspended elements. Once the system is relocated into position, UAV 400 may place power source 430 back on the ground to reduce the power required to hover in place.

In embodiments, power source 430 may be replaceable during flight. For instance, UAV 400 may hover during replacement of power source 430. In such embodiments, UAV 400 may include a built-in power source to power flight during replacement of power source 430. In embodiments, the end of cable 718 may be plugged into an electrical energy source to charge the built-in power source while UAV 400 is hovering in place.

Figure 8:
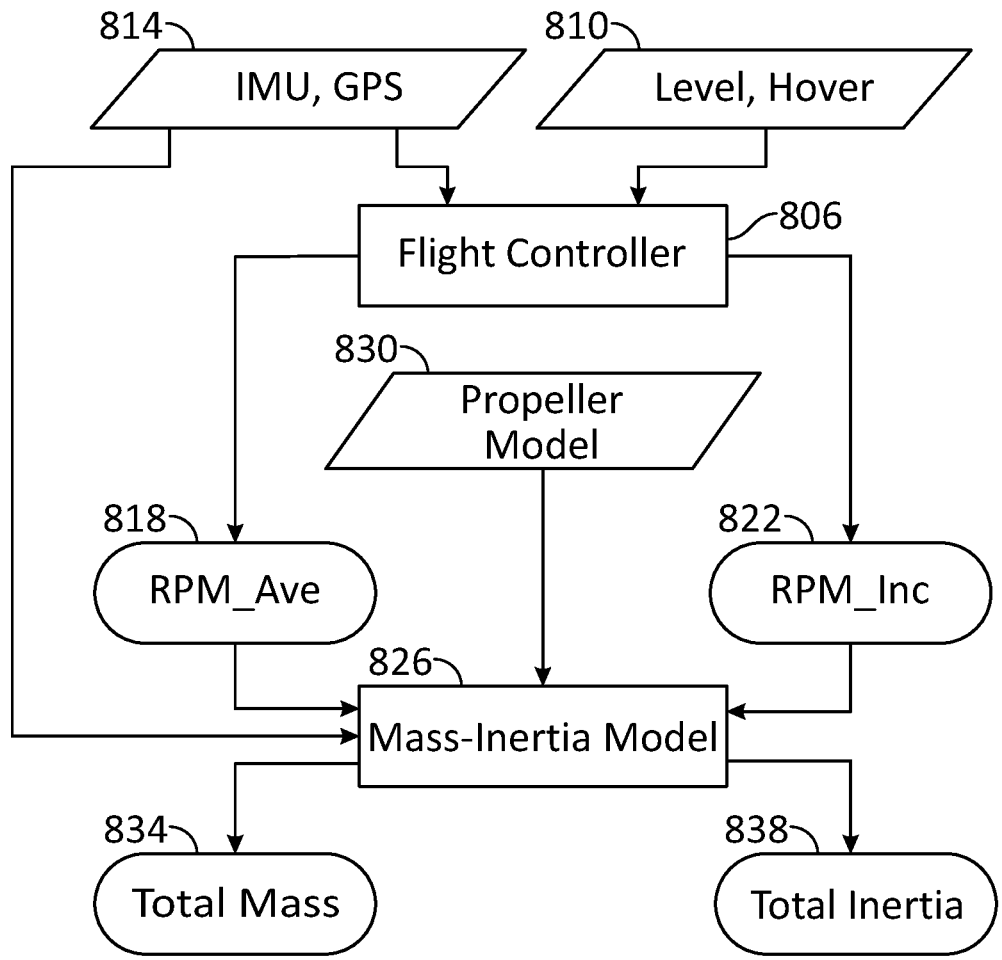
FIG. 8 illustrates a logic diagram of detecting suspended propulsion of a UAV, in accordance with an embodiment of the disclosure.

FIG. 8 illustrates a logic diagram of detecting suspended propulsion of a UAV (e.g., UAV 400), in accordance with an embodiment of the disclosure. There may be several methods for UAV 400 to detect the presence of suspended propulsion (e.g., to detect SPS 410, 510, 610, 710). For example, a mission planner may have a capability to define the suspended system manually. In embodiments, suspended elements may be recognized by aircraft cameras (e.g., fixed imaging system 128, imaging system 141, etc.), either by direct image recognition or by finding and identifying dedicated bar code and/or QR code stickers. In embodiments, a power cable between the suspended system and UAV 400 (e.g., cable 460, flexible harness 540, cable 718, etc.) may transmit data. In such embodiments, a flight controller 806 may have explicit information about the suspended system. The explicit information may include what is attached, the mass of the suspended system, the type of attachment, remaining fuel, burn rate, etc.

If the electrical connection between the suspended system and UAV 400 includes only power lines, a special logic can be used to detect what is attached to UAV 400. FIG. 8 illustrates a flow diagram of one such process. As shown, the detection starts with a command to maintain level flight at a constant altitude ("Level, hover" 810). Based on IMU and GPS readings (e.g., "IMU, GPS" 814 from gyroscope/accelerometer 116 and/or GNSS 118), flight controller 806 may produce RPM commands for all rotors. For example, an average RPM command ("RPM_ave" 818) for all rotors and an incremental RPM command ("RPM_inc" 822) for pitch and roll may be resolved by flight controller 806. A mass-inertia model 826 may use the average and incremental RPM commands and a propeller model 830 to resolve forces generated by each rotor. Based on IMU/GPS readings and known forces, total mass 834 and total inertia 838 can be found. The same logic can be used to detect an automatic drop of a depleted battery or an empty fuel tank. For example, based on a sudden, and then permanent, change in total mass and total inertia, the system can identify a drop event and adjust control gains accordingly.

Figure 9:
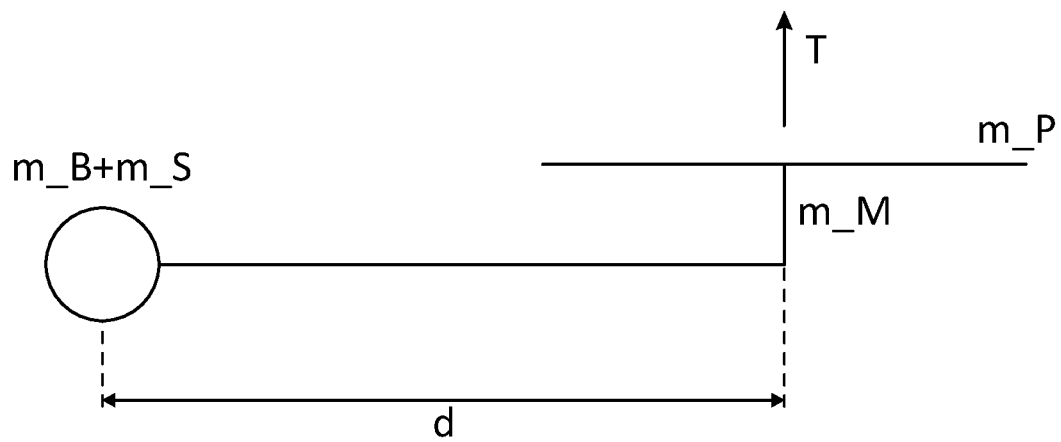
FIG. 9 illustrates a schematic diagram of a UAV utilizing a rigidly attached propulsion system, in accordance with an embodiment of the disclosure.

FIG. 9 illustrates a schematic diagram of a UAV utilizing a rigidly attached propulsion system, in accordance with an embodiment of the disclosure. A multi-rotor aircraft must continuously adjust thrust of its rotors to maintain desired attitude and orientation. FIG. 9, for instance, illustrates a reduced schematic (e.g., due to two planes of symmetry) of such an aircraft, such as having a body with rigidly attached propulsion system, an arm, a motor, and a propeller. In such embodiments, the applied thrust of the aircraft's rotors must be sufficient to overcome various torques or moments of force, such as moments caused by the aircraft's propeller (m_P), motor (m_M), body (m_B), and suspended propulsion system (m_S).

Referring to FIG. 9, the ability of a rotorcraft to maintain desired attitude is described by angular jerk (speed of acceleration). To produce a required body jerk, a propeller-motor combination must have a certain rate of thrust. From the desired angular jerk and aircraft parameters, the required motor torque may be derived from Equation (1) below (e.g., running on mass-inertia model 826), illustrating that the required motor torque, and thus power to maintain attitude, is proportional to the aircraft total moment of inertia:

$$\tau_M = \tau_D + \frac{\gamma_{max} I_T I_P}{d\rho(c_1 + 2c_2 \omega_P)} \quad (1)$$

where $\tau_M$=torque required from motor;
$\tau_D$=propeller drag torque;
$\gamma_{max}$=required aircraft angular jerk (rad/s$^3$);
$I_T$=aircraft moment of inertia around horizontal axis perpendicular to the arm;
$I_P$=propeller and motor rotor moment of inertia around axis of rotation;
d=arm length
$\rho$=air density;
$c_1, c_2$=linearizations coefficient for propeller thrust vs. RPM curve; and
$\omega_P$=propeller speed.

Figure 10:
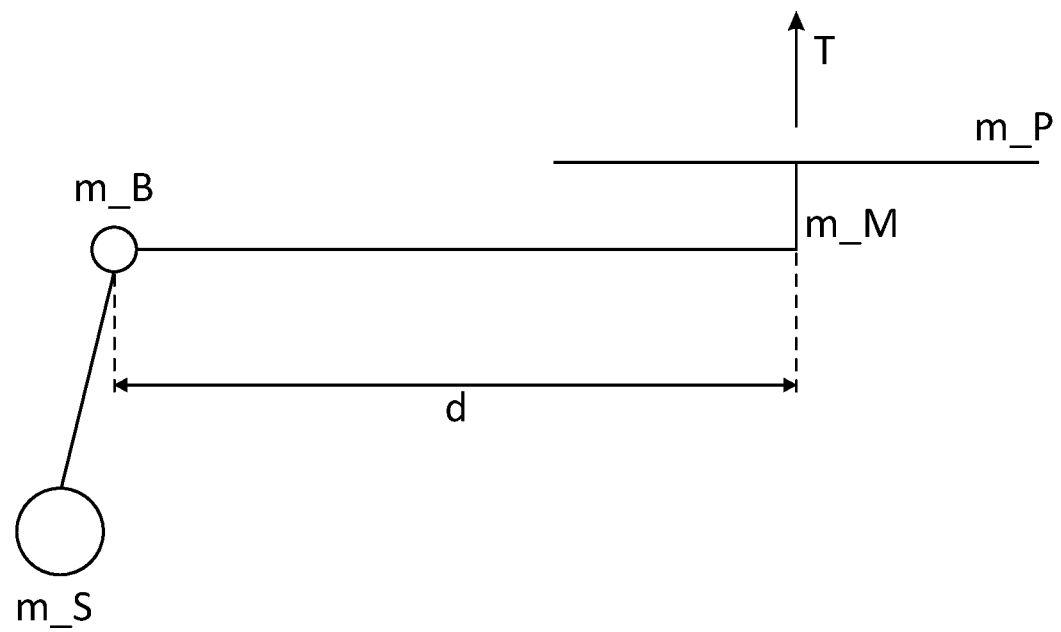
FIG. 10 illustrates a schematic diagram of a UAV utilizing a suspended propulsion system having multiple degrees of rotational freedom, in accordance with an embodiment of the disclosure.

FIG. 10 illustrates a schematic diagram of a UAV utilizing a suspended propulsion system having multiple degrees of rotational freedom, in accordance with an embodiment of the disclosure. Unlike FIG. 9, FIG. 10 considers an aircraft with an additional system suspended on a 3-degree of freedom joint. In this case, the total inertia of the aircraft does not include the inertia of the suspended system. For example, according to Equation (1), this configuration would require a smaller amount of power to maintain attitude and orientation.

Figure 11:
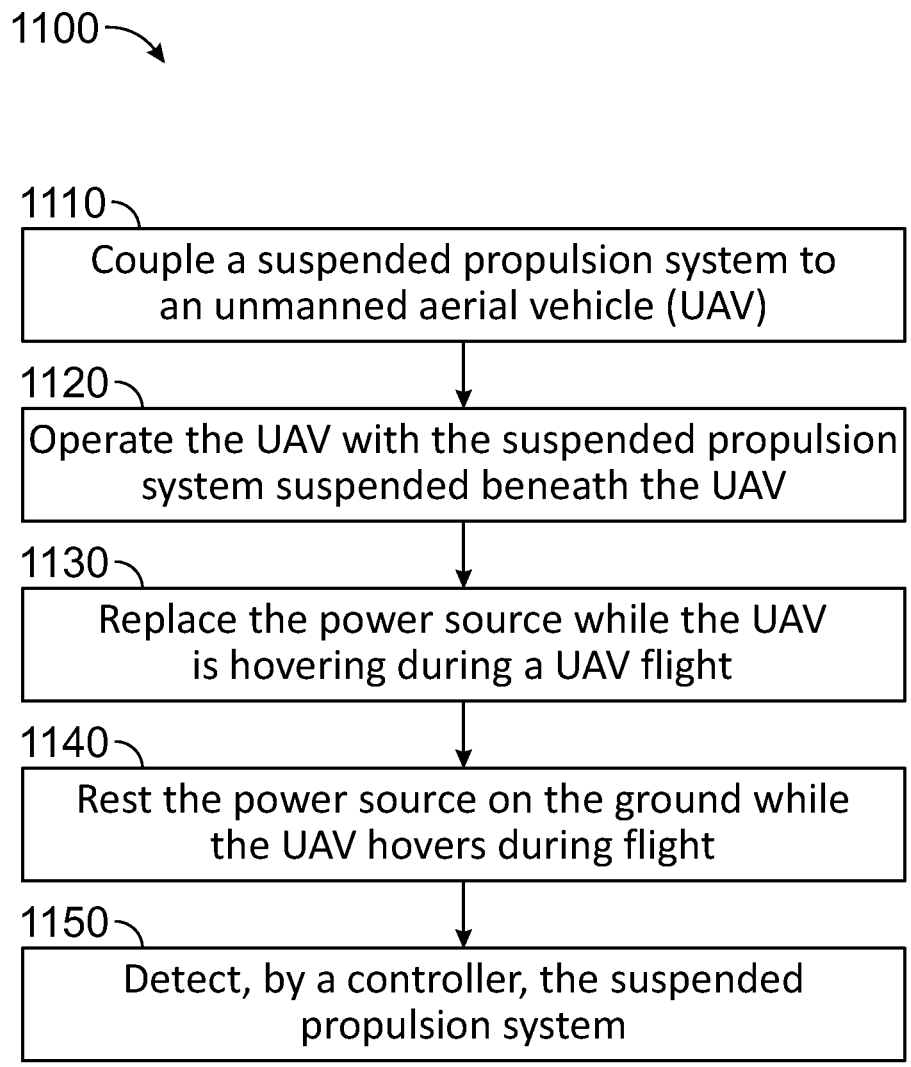
FIG. 11 illustrates a process of operating a UAV, in accordance with an embodiment of the disclosure.

FIG. 11 illustrates a process 1100 of operating a UAV, in accordance with an embodiment of the disclosure. Although described with reference to FIGS. 1-10, process 1100 may be used in connection with other embodiments. Note that one or more operations of FIG. 11 may be combined, omitted, and/or performed in a different order as desired.

In block 1110, process 1100 includes coupling a suspended propulsion system to a UAV. In embodiments, the UAV may be similar to UAV 400, described above. For instance, the UAV may have a body and a center of gravity (CG), similar to body 416 and CG 424 described above.

The suspended propulsion system may be similar to SPS 410, SPS 510, SPS 610, or SPS 710, described above. For example, the suspended propulsion system may include a power source for the UAV and a harness coupled to the UAV to suspend at least a portion of the power source under the CG of the UAV, similar to power source 430 and harness 434 described above.

In embodiments, block 1110 includes decoupling an inertia of the suspended propulsion system from an inertia of the UAV, such as in a manner as described above. For example, the harness may include a rigid harness including an arc-shaped hoop attached to a body of the UAV at a pair of joints, the hoop configured to pivot about a horizontal axis defined by the pair of joints to provide a first rotational degree of freedom between the suspended propulsion system and the UAV, and the power source coupled to the hoop to slide along the hoop between the pair of joints to provide a second rotational degree of freedom between the suspended propulsion system and the UAV. Alternatively, the harness may include a flexible harness attached to the UAV under the CG to provide three degrees of rotational freedom between the suspended propulsion system and the UAV.

In block 1120, process 1100 includes operating the UAV with the suspended propulsion system suspended beneath the UAV. Block 1120 may include decoupling a lowermost element of a plurality of elements of the power source from the harness during flight of the UAV, such as in a manner as described above.

In block 1130, process 1100 includes replacing the power source while the UAV is hovering during a UAV flight, such as in a manner as described above. For example, the UAV may include a built-in power source to power the UAV flight during replacement of the power source.

In block 1140, process 1100 includes resting the power source on the ground while the UAV hovers during flight, such as in a manner as described above. For example, the power source may be coupled to the UAV via a long cable or flexible harness. In such embodiments, the power source may be positioned on the ground with slack introduced into the long cable or flexible harness to conserve energy.

In block 1150, process 1100 includes detecting, by a controller, the suspended propulsion system. For example, flight controller 806 may detect one or more of SPS 410, SPS 510, SPS 610, or SPS 710, as described above. For instance, the suspended propulsion system may be detected by resolving (e.g., by mass-inertia model 826) a total mass of the UAV and a total inertia of the UAV based on average RPM command 818, incremental RPM command 822, and/or propeller model 830 to maintain a level flight at a constant altitude.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:
   an unmanned aerial vehicle (UAV) having a body with a rigidly attached propulsion system and having a center of gravity (CG);
   wherein the system comprises a propulsion system comprising the rigidly attached propulsion system comprising one or more thrusters to move the UAV;
   wherein the propulsion system further comprises a suspended propulsion system coupled to the body of the UAV, the suspended propulsion system comprising:
   a power source for providing energy to the one or more thrusters, and
   a harness coupled to the UAV to suspend at least a portion of the power source under the CG of the UAV.

2. The system of claim 1, wherein the harness is configured to decouple an inertia of the suspended propulsion system from an inertia of the UAV;
   wherein at least one of the one or more thrusters provides a lift to the UAV.

3. The system of claim 2, wherein the harness comprises an inflexible harness configured to provide at least two rotational degrees of freedom between the UAV and the power source.

4. The system of claim 3, wherein the inflexible harness comprises an arc-shaped hoop attached to the body at a pair of joints, the hoop configured to pivot about a horizontal axis defined by the pair of joints, the power source coupled to the hoop to slide along the hoop between the pair of joints.

5. The system of claim 2, wherein the harness comprises a non-rigid harness attached to the UAV under the CG to provide an additional rotational degree of freedom between the UAV and the power source.

6. The system of claim 5, wherein the power source comprises a plurality of elements suspended along the non-rigid harness.

7. The system of claim 6, wherein at least a lowermost element of the plurality of elements is configured to decouple from the harness during flight of the UAV.

8. The system of claim 5, wherein:
   the power source is replaceable while the UAV is hovering during a UAV flight; and
   the UAV comprises a built-in power source to power the UAV flight during a replacement of the power source.

9. The system of claim 5, wherein the system is configured to rest the power source on the ground while the UAV hovers during flight.

10. The system of claim 1, wherein the power source comprises at least one of a battery, a fuel cell, or a solar panel; and
    the system further comprises an electric cable configured to provide power from the power source to the UAV.

11. A method comprising:
    coupling a suspended propulsion system to an unmanned aerial vehicle (UAV) having a body with a rigidly attached propulsion system and having a center of gravity (CG) to form a system which comprises a propulsion system comprising:
    the suspended propulsion system; and
    the rigidly attached propulsion system comprising one or more thrusters to move the UAV;
    wherein the suspended propulsion system comprises:
    a power source for providing energy to the one or more thrusters, and
    a harness coupled to the UAV to suspend at least a portion of the power source under the CG of the UAV.

12. The method of claim 11, wherein the coupling comprises decoupling an inertia of the suspended propulsion system from an inertia of the UAV;
    wherein at least one of the one or more thrusters provides a lift to the UAV.

13. The method of claim 11, further comprising operating the UAV with the suspended propulsion system suspended beneath the UAV.

14. The method of claim 13, wherein the operating comprises decoupling a lowermost element of a plurality of elements of the power source from the harness during flight of the UAV.

15. The method of claim 11, further comprising replacing the power source while the UAV is hovering during a UAV flight, wherein the UAV comprises a built-in power source to power the UAV flight during replacement of the power source.

16. The method of claim 11, further comprising resting the power source on the ground while the UAV hovers during flight.

17. The method of claim 11, further comprising detecting, by a controller, the suspended propulsion system, wherein the detecting comprises resolving, by a mass-inertia model, a total mass of the UAV and a total inertia of the UAV based on an average RPM command and an incremental RPM command to maintain a level flight at a constant altitude.

18. The method of claim 11, wherein the harness comprises an inflexible harness comprising an arc-shaped hoop attached to a body of the UAV at a pair of joints, the hoop configured to pivot about a horizontal axis defined by the pair of joints to provide a first rotational degree of freedom between the suspended propulsion system and the UAV, the power source coupled to the hoop to slide along the hoop between the pair of joints to provide a second rotational degree of freedom between the suspended propulsion system and the UAV.

19. The method of claim 11, wherein the harness comprises a non-rigid harness attached to the UAV under the CG to provide three degrees of rotational freedom between the suspended propulsion system and the UAV.

20. The method of claim 11, wherein the power source comprises at least one of a battery, a fuel cell, or a solar panel; and the method comprises providing propulsion power from the power source to the UAV via an electric cable.

* * * * *